United States Patent [19]

Burbank

[11] 4,332,569
[45] Jun. 1, 1982

[54] INSTRUCTIONAL DEVICE FOR USE OF A BRONCHOSCOPE

[75] Inventor: Peter L. Burbank, Lexington, Ky.

[73] Assignee: University of Kentucky Research Foundation, Lexington, Ky.

[21] Appl. No.: 244,203

[22] Filed: Mar. 16, 1981

[51] Int. Cl.³ ............................................. G09B 23/30
[52] U.S. Cl. .................................................... 434/272
[58] Field of Search ........................ 434/262, 267, 272

[56] References Cited

U.S. PATENT DOCUMENTS

| | | | |
|---|---|---|---|
| 3,376,659 | 4/1968 | Asin | 434/272 |
| 3,579,858 | 5/1971 | Bentov | 434/272 |
| 4,167,070 | 9/1979 | Orden | 434/272 |

FOREIGN PATENT DOCUMENTS

| | | | |
|---|---|---|---|
| 181889 | 7/1966 | U.S.S.R. | 434/272 |
| 306490 | 8/1971 | U.S.S.R. | 434/272 |

*Primary Examiner*—Harland S. Skogquist
*Attorney, Agent, or Firm*—Frank C. Leach, Jr.

[57] ABSTRACT

A hollow body is in the shape of a tracheobronchial tree having a plurality of segments. The hollow body is supported in a carrying container so as to be hidden from view while having its entrance opening disposed to receive a bronchoscope operated by a trainee. The hollow body has forty openings at various locations for various segments of the tree with each opening having one end of a fiber optic bundle disposed therein. The other end of each of the fiber optic bundles is supported in an opening in a backing plate. A photographic print of a drawing of a tracheobronchial tree having the same segments as the model is secured to the upper surface of the backing plate. Each of the openings in the backing plate is aligned with an opening in the print so that a light from the probe of the bronchoscope illuminates the same segment of the tracheobronchial tree of the print as the segment of the hollow body having the probe of the bronchoscope inserted therein. Viewing of the print by the trainee can be prevented so that testing of the trainee may be accomplished.

10 Claims, 6 Drawing Figures

INSTRUCTIONAL DEVICE FOR USE OF A BRONCHOSCOPE

This invention relates to an instructional device for teaching and testing a person in the use of a bronchoscope in a tracheobronchial tree of a patient.

In performing a bronchoscopy on a patient, a probe of a bronchoscope is inserted through the mouth or nose of a patient into the patient's tracheobronchial tree. The tracheobronchial tree contains a number of segments, and it is necessary for the user of the bronchoscope to be capable of inserting the probe of the bronchoscope in the correct segment of the patient's tracheobronchial tree. This requires the user of the bronchoscope to have a feel for positioning the probe in the various segments of a patient's tracheobronchial tree.

The bronchoscope has its probe directing light from a light source through fiber optical bundles to illuminate the tracheobronchial tree in the area of the end of the probe. Furthermore, the bronchoscope has coherent fiber optic bundles to enable the user to be able to see the illuminated area of the patient's tracheobronchial tree through a lens system. The bronchoscope has an operating lever to enable rotation to a degree of the probe so that the end of the probe can be maneuvered in the tracheobronchial tree whereby various portions of the patient's tracheobronchial tree are illuminated as the position of the probe is changed. The operating lever, the light source, and the lens system are mounted in the portion of the bronchoscope held by the user.

One prior means of instructing the user of a bronchoscope so that the user develops a feel for positioning the probe of the bronchoscope in the tracheobronchial tree of a patient is a bronchoscopic trainer sold by High Stoy Technological Corporation, Bohemia, N.Y. This trainer has a model of a patient's tracheobronchial tree with a head thereon. In this trainer, each of twenty-one segments of the tree, which is hidden from view of the trainee, has a photocell supported therein to convert the light from the bronchoscope to an electrical signal, which is transmitted by a conductive wire to another photocell where the electrical signal is converted to light the same segment on a picture of a tracheobronchial tree. Because of the size of the photocells, the locations of the photocells are limited so that all segments of the tracheobronchial tree capable of having the probe of the bronchoscope inserted therein do not have a separate photocell. For example, there may be only a photocell at the entrance to two bifurcated segments, which are each capable of receiving the probe of the bronchoscope, whereby the trainee could not determine in which of these two segments that the probe of the bronchoscope was inserted.

Thus, while the High Stoy bronchoscopic trainer is capable of enabling one to learn to use the bronchoscope to some extent, it is limited in developing the feel for the user of the bronchoscope as to where the probe of the bronchoscope is located. This is because the user cannot determine from the trainer when the probe of the bronchoscope is inserted in one of two bifurcated segments because of the limited number of locations at which photocells can be disposed.

The instructional device of the present invention avoids the problem of the High Stoy bronchoscopic trainer since it enables the user to be able to ascertain the location of the probe of the bronchoscope in a much larger number of segments of the tracheobronchial tree than the High Stoy bronchoscopic trainer with this number of segments being each of the segments of the tracheobronchial tree in which the probe of the bronchoscope can be inserted. The instructional device of the present invention is capable of having forty different locations of the tracheobronchial tree at which it can be ascertained that the probe of the bronchoscope is located. Thus, for example, it can be ascertained in which of two bifurcated segments that the probe of the bronchoscope is located rather than just knowing that the probe of the bronchoscope is in one of the two bifurcated segments as in the High Stoy bronchoscopic trainer. This allows the trainee to become more proficient in the feel and use of a bronchoscope.

The instructional device of the present invention also is relatively inexpensive in comparison with the High Stoy bronchoscopic trainer. The instructional device of the present invention eliminates the expense of the photocells and the conversion of the light signal from the probe of the bronchoscope to an electrical signal and the electrical signal to a light signal at a display picture of a tracheobronchial tree.

The instructional device of the present invention eliminates the need for the conversion of light to electricity and electricity to light by utilizing fiber optic bundles or tubes to transmit light, which is from the probe of the bronchoscope, from the model of the tracheobronchial tree to a display element having a tracheobronchial tree. Furthermore, because the size of a fiber optic bundle is relatively small in comparison with the size of a photocell, the fiber optic bundle can be disposed in a much smaller opening in a model of the tracheobronchial tree than the opening required when using the photocell.

An object of this invention is to provide a relatively inexpensive instructional device for teaching and testing one in the use of a bronchoscope.

Another object of this invention is to provide an instructional device for teaching and testing one in the use of a bronchoscope in which each segment of the tracheobronchial tree capable of receiving the probe of the bronchoscope is utilized for teaching and testing.

Other objects of this invention will be readily perceived from the following description, claims, and drawings.

This invention relates to an instructional device for instructing a person in the use of a bronchoscope in a tracheobronchial tree of a patient. The device includes a hollow body having the shape of a tracheobronchial tree including a plurality of segments with support means to support the hollow body so that the tracheobronchial tree segments of the hollow body are hidden from view. The hollow body has an entrance opening to receive a bronchoscope for insertion of a probe of the bronchoscope into one of the tracheobronchial tree segments by the person being instructed. The hollow body has a plurality of openings located at various of the tracheobronchial tree segments. The device also includes display means of a tracheobronchial tree having at least the same plurality of segments as the tracheobronchial tree segments of the hollow body with the display means supported by the support means. Separate fiber optic means extend from each of the openings in the hollow body to transmit light from a probe of a bronchoscope in the hollow body to the same corresponding location of the tracheobronchial tree of the display means to indicate on the tracheobronchial tree of the display means the location of the probe of the bronchoscope in the hollow body.

The attached drawings illustrate a preferred embodiment of the invention, in which.

Figure 1:
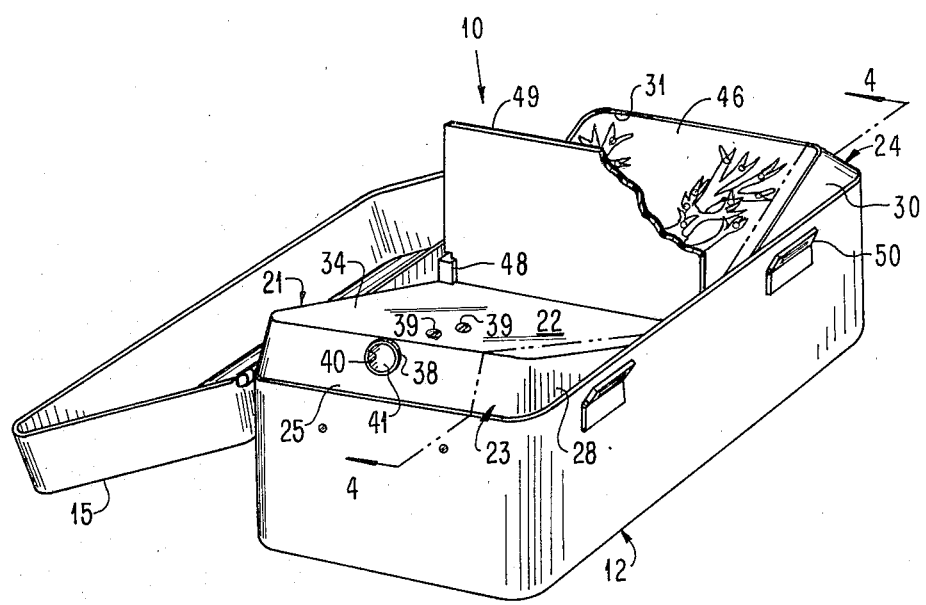
FIG. 1 is a perspective view of an instructional device of the present invention.
Figure 2:
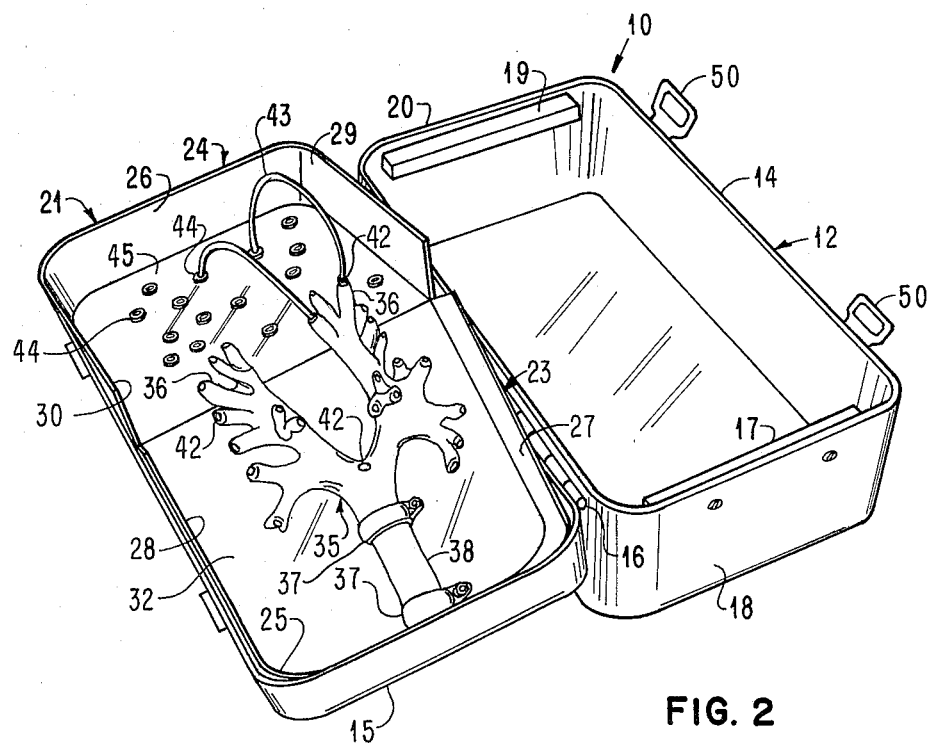
FIG. 2 is a perspective view of the instructional device of FIG. 1 with the shell of the device removed from its support to enable viewing of the underside of the shell and the elements supported thereby and with some parts omitted for clarity purposes.
Figure 4:
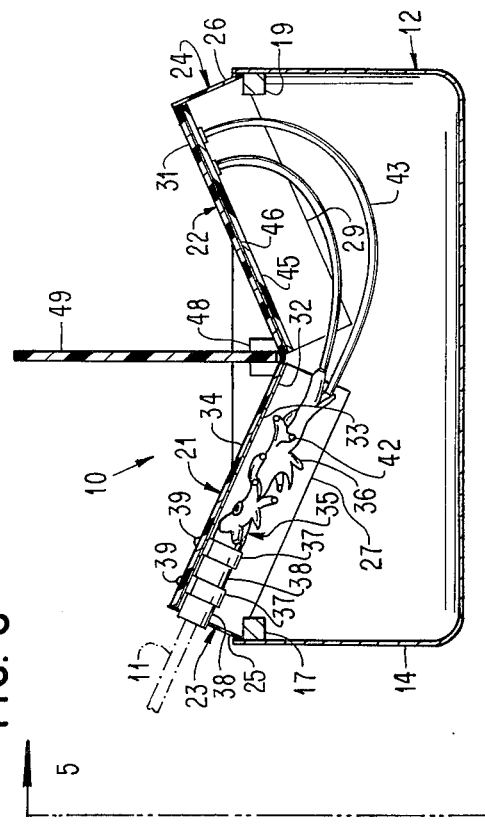
FIG. 4 is a sectional view of the instructional device of the present invention and taken along line 4—4 of FIG. 1.
Figure 6:
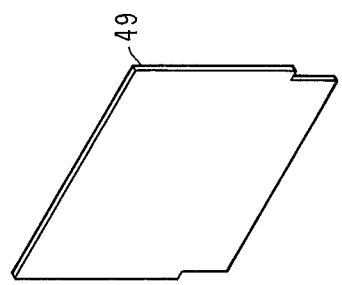
FIG. 6 is a perspective view of an element utilized when the user is being tested rather than taught.

Referring to the drawings and particularly FIG. 1, there is shown an instructional device 10 for teaching one to use a bronchoscope 11 (partly shown in phantom in FIG. 4). The instructional device 10 includes a carrying container or case 12 having a hollow support portion 14 (see FIG. 2) and a lid or cover 15 pivotally connected thereto by a hinge 16 for movement between open and closed positions.

The hollow support portion 14 has a support 17 mounted on the inner surface of its side wall 18 and a support 19 mounted on the inner surface of its side wall 20, which is parallel to the side wall 18. A shell 21, which is formed of a suitable bendable plastic such as Uvex, for example, is supported within the hollow support portion 14 on the supports 17 and 19.

The shell 21 includes a V-shaped top 22 (see FIGS. 1 and 4) and ends 23 and 24. The top 22 and the ends 23 and 24 are secured to each other by a suitable adhesive such as methyl methacrylate monomer, for example. The V-shaped top 22 is bent so that the lid 15 (see FIG. 1) can be moved to its closed position without the shell 21 interfering therewith.

The end 23 of the shell 21 has its end wall 25 resting on the support 17 (see FIG. 2), and the end 24 of the shell 21 has its end wall 26 resting on the support 19. The shell 21 is secured to the hollow support portion 14 by an adhesive between the outer surface of the end wall 25 of the end 23 of the shell 21 and the inner surface of the side wall 18 of the hollow support portion 14 and by an adhesive between the outer surface of the end wall 26 of the end 24 of the shell 21 and the inner surface of the side wall 20 of the hollow support portion 14. One suitable example of the adhesive is Dow Corning 732 silicone rubber sealant.

The end 23 of the shell 21 has a pair of side walls 27 and 28 integral with the end wall 25. The end 24 of the shell 21 has a pair of side walls 29 and 30 integral with the end wall 26. Thus, when the shell 21 is supported in the hollow support portion 14 of the carrying container or case 12 as shown in FIGS. 1 and 4, the shell 21 blocks view to the interior of the hollow support portion 14 (see FIG. 2).

The shell 21 is opaque through having been spray painted on its inner surface except for a portion 31 (see FIG. 1) of the top 22. The portion 31 is transparent to enable viewing therethrough.

The shell 21 has a sheet 32 (see FIG. 4) of aluminum foil, for example, secured to bottom surface 33 of a portion 34 of the top 22 of the shell 21 by any suitable adhesive. One suitable example of the adhesive is Dow Corning 732 silicone rubber sealant.

A hollow body 35, which is made of silicone rubber, is supported beneath the bottom surface 33 of the portion 34 of the top 22 of the shell 21. One suitable example of the hollow body 35 is a Zavala lung model sold by Medi Tech Division of Cooper Scientific Corporation, Watertown, Mass. The hollow body 35 has the shape of a tracheobronchial tree of a human being with various segments 36.

The hollow body 35 is secured to the portion 34 of the top 22 of the shell 21 by suitable means such as round clamps 37, which may be formed of any suitable material such as nylon, for example, extending around a cylindrical entrance portion 38 of the hollow body 35. Each of the round clamps 37 is secured to the portion 34 of the top 22 of the shell 21 by screws 39.

The end wall 25 of the end 23 of the shell 21 has an opening 40 (see FIG. 1) to receive the end of the cylindrical entrance portion 38 of the hollow body 35 (see FIG. 2) to enable it to protrude slightly beyond the shell 21. The entrance portion 38 of the hollow body 35 has an entrance opening 41 (see FIG. 1) to enable the bronchoscope 11 (see FIG. 4) to be inserted therein for insertion into the interior of the hollow body 35.

The hollow body 35 has a plurality of openings 42 (see FIG. 2) formed therein at various of the segments 36. Thus, each of the openings 42 transmits light from the probe of the bronchoscope 11 (see FIG. 4) when the probe is disposed within the segment 36 having the opening 42. There are forty of the openings 42 so that forty different locations of the probe of the bronchoscope 11 within the hollow body 35 can be ascertained owing to light passing through the opening 42 when the probe of the bronchoscope 11 is disposed in the segment 36 having the opening 42.

Each of the openings 42 in the hollow body 35 has one end of a fiber optic bundle 43 extending thereinto and secured to the hollow body 35 by a suitable adhesive. One suitable example of the adhesive is Dow Corning 732 silicone rubber sealant.

The other end of the fiber optic bundle 43 extends through an opening 44 (see FIG. 2) in a backing plate 45, which may be formed of a suitable material such as a clear plastic sold as Plexiglas, for example. The other end of the fiber optic bundle 43 is secured to the backing plate 45 by a suitable adhesive such as Dow Corning 732 silicone rubber sealant, for example.

The upper surface of the backing plate 45 has a photographic print 46 (see FIG. 4) of a drawing of the main portion of a tracheobronchial tree attached thereto by any suitable adhesive. One suitable example of the adhesive is a double sided adhesive tape having adhesive on both sides.

Figure 3:
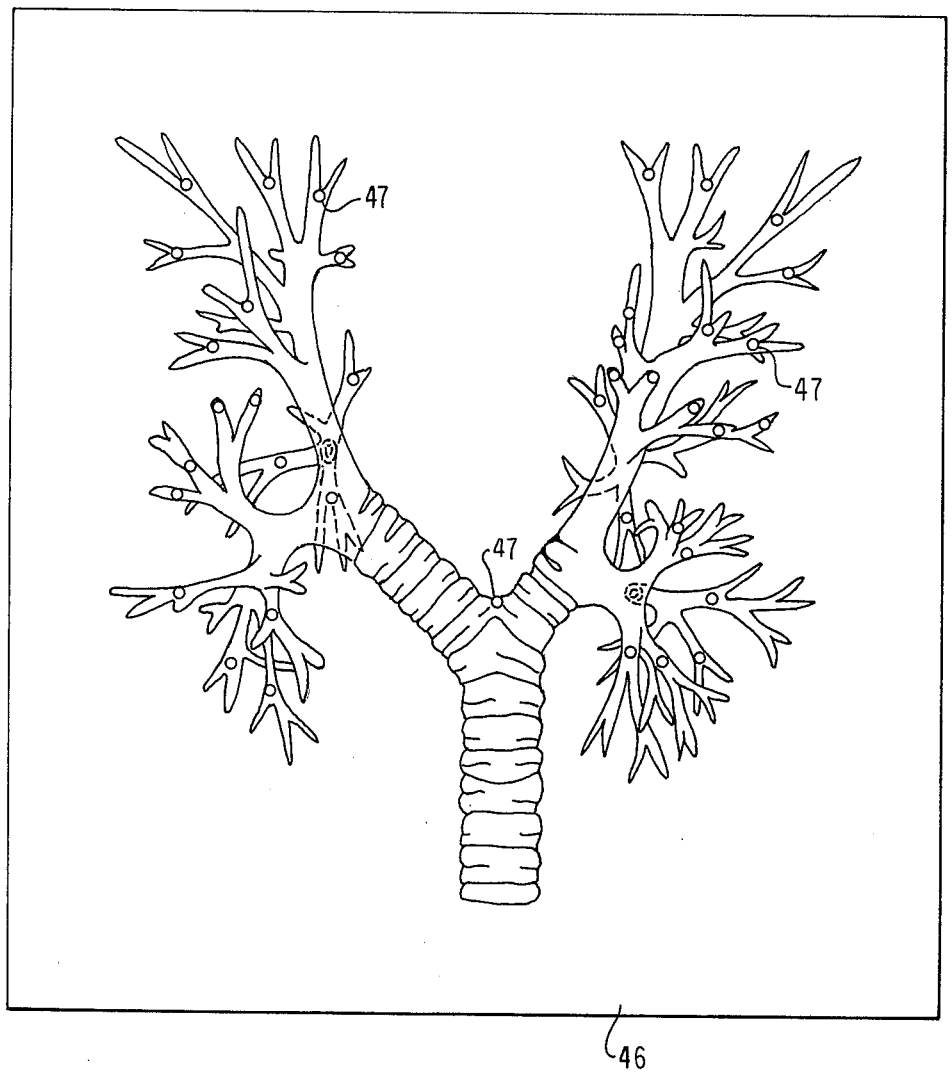
FIG. 3 is a view of a photographic print of a drawing of a tracheobronchial tree and showing the various openings therein at which the location of the probe of the bronchoscope can be sensed.

As shown in FIG. 3, the print 46 has openings 47 to receive the fiber optic bundles 43 (see FIG. 4). Thus, each of the fiber optic bundles 43 extends from the same segment of the tracheobronchial tree on the print 46 to the same segment 36 of the tracheobronchial tree of the hollow body 35.

As shown in FIG. 3, the print 46 has additional segments of the tracheobronchial tree extending beyond the locations of the openings 47 for the fiber optic bundles 43 (see FIG. 4). However, the hollow body 35 has the fiber optic bundles 43 connected at the ends of the segments 36 of the tracheobronchial tree of the hollow body 35. This is because the size of the probe of the bronchoscope 11 prevents it from being pushed any further into segments of the tracheobronchial tree of a human being than the segments 36 of the tracheobronchial tree of the hollow body 35. The tracheobronchial tree of a human being extends several generations of segments beyond that shown in the print 46 of FIG. 3.

The shell 21 (see FIGS. 1 and 4) has a pair of plastic rails 48 (one shown in FIGS. 1 and 4) supported at the junction of the portions 31 and 34 of the top 22 of the shell 21. The rails 48 receive an opaque panel 49 for support when it is desired to test the trainee to ascertain if the trainee can insert the probe of the bronchoscope 11 (see FIG. 4) into the correct segment 36 of the tracheobronchial tree of the hollow body 35. The opaque panel 49 is formed of a suitable plastic such as Plexiglas, for example, which is spray painted to be made opaque.

Figure 5:
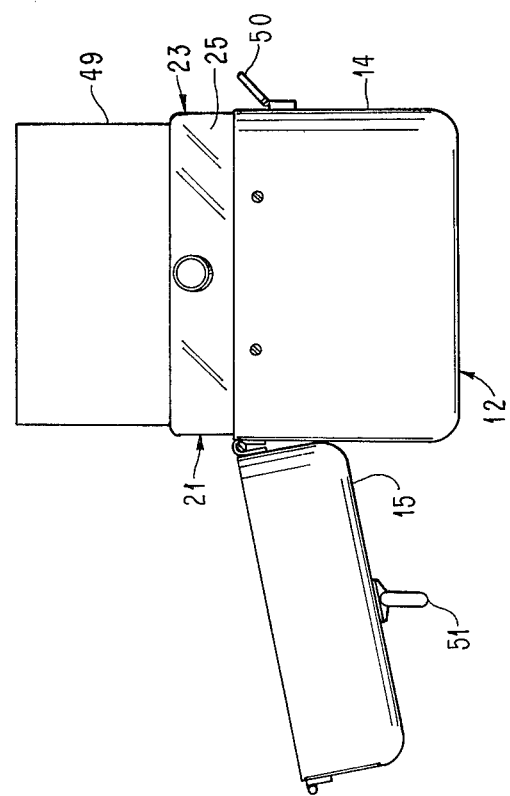
FIG. 5 is an end elevational view of the instructional device of FIG. 4 and taken along line 5—5 of FIG. 4.

When it is desired to transport the carrying container or case 12, the opaque panel 49 must be removed from the rails 48. Then, the lid 15 (see FIG. 2) is moved to its closed position and retained therein by latches 50. A handle 51 (see FIG. 5) on the lid 15 is then employed to lift the carrying container or case 12.

The shell 21 (see FIGS. 1 and 4) is formed through bending the top 22 to the desired V-shape of the portions 31 and 34. Then, each of the ends 23 and 24 is secured to the top 22 by the adhesive.

After the shell 21 has been formed, its inner surfaces are spray painted, except for the portion 31, to be made opaque. The sheet 32 of aluminum foil is attached to the bottom surface 33 of the portion 34 of the top 22 of the shell 21 to prevent any viewing of the hollow body 35 when the bronchoscope 11 is inserted into the hollow body 35 so as to illuminate the portion of the hollow body 35 at the end of the probe of the bronchoscope 11.

Through using the tracheobronchial tree on the print 46 as a guide, the openings 44 (see FIG. 2) are drilled in the desired locations in the backing plate 45 to receive the fiber optic bundles 43. The openings 44 in the backing plate 45 are countersunk with each having its larger end at the upper surface of the backing plate 45.

After the openings 44 have been formed in the backing plate 45, the print 46 is secured to the backing plate 45 by the double adhesive tape. Then, each of the openings 47 (see FIG. 3) is formed in the print 46 in alignment with one of the openings 44 (see FIG. 2) in the backing plate 45.

After one end of each of the fiber optic bundles 43 has been heat glazed, for example, to smooth the cut ends so that there is better transmission of the light transmitted by the fiber optic bundle 43, each of the fiber optic bundles 43 is inserted through one of the openings 47 (see FIG. 3) in the print 46 and the aligned opening 44 (see FIG. 2) in the plate 45 and extended to the opening 42 in the segment 36 of the tracheobronchial tree of the hollow body 35 corresponding to the segment of the tracheobronchial tree of the print 46 (see FIG. 3). Prior to inserting this end of the fiber optic bundle 43 (see FIG. 2) into the opening 42, this end of the fiber optic bundle 43 is heat glazed. Of course, the hollow body 35 is secured to the portion 34 (see FIG. 4) of the top 21 by the clamps 37 prior to the ends of the fiber optic bundles 43 being disposed in the openings 42 in the segments 36 of the tracheobronchial tree of the hollow body 35.

Next, the shell 21 is disposed within the hollow support portion 14 of the carrying container or case 12. The bottom of the end wall 25 of the end 23 of the shell 21 rests on the support 17 of the hollow support portion 14 and the bottom of the end wall 26 of the end 24 rests on the support 19 of the hollow support portion 14. Then, the shell 21 is secured to the hollow support portion 14 by the suitable adhesive such as Dow Corning 732 silicone rubber sealant, for example.

When one is to be trained in the use of the bronchoscope 11, the opaque panel 49 is removed from the rails 48 so that it does not block the view of the print 46 of the tracheobronchial tree by the trainee. Then, the bronchoscope 11 is inserted into the entrance opening 41 (see FIG. 1) of the hollow body 35. The light of the bronchoscope 11 (see FIG. 4) exits through the end of the probe and is transmitted by one of the fiber optic bundles 43 in accordance with the position of the probe of the bronchoscope 11 in the hollow body 35. This results in lighting the same segment of the tracheobronchial tree on the print 46.

When it is desired to test the trainee, the panel 49 is disposed in the position of FIGS. 1 and 4. This prevents viewing of the print 46 by the trainee.

Then, an instructor can require the trainee to insert the bronchoscope 11 (see FIG. 4) into a specific one of the segments 36 of the tracheobronchial tree of the hollow body 35. The instructor can then view the print 46 to ascertain if the probe of the bronchoscope 11 has been disposed in the correct segment 36 of the tracheobronchial tree of the hollow body 35.

An advantage of this invention is that it is a less expensive bronchoscopic trainer than the previously available bronchoscopic trainer. Another advantage of this invention is that it enables a trainee to learn to position the probe of the bronchoscope in each segment of a tracheobronchial tree in which the probe of the bronchoscope can be inserted in a tracheobronchial tree of a human being. A further advantage of this invention is that it is relatively lightweight and is easily transportable.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An instructional device for instructing a person in the use of a bronchoscope in a tracheobronchial tree of a patient including:
   a hollow body having the shape of a tracheobronchial tree including a plurality of segments;
   support means to support said hollow body so that said tracheobronchial tree segments of said hollow body are hidden from view;
   said hollow body having an entrance opening to receive a bronchoscope for insertion of a probe of the bronchoscope into one of said tracheobronchial tree segments by the person being instructed;
   said hollow body having a plurality of openings located at various of said tracheobronchial tree segments;
   display means of a tracheobronchial tree having at least the same plurality of segments as said tracheobronchial tree segments of said hollow body, said display means being supported by said support means;

and separate fiber optic means extending from each of said openings in said hollow body to transmit light from a probe of a bronchoscope in said hollow body to the same corresponding location of the tracheobronchial tree of said display means to indicate on the tracheobronchial tree of said display means the location of the probe of the bronchoscope in said hollow body.

2. The device according to claim 1 including means to prevent the person being instructed from viewing said display means when a bronchoscope is inserted in said entrance opening in said hollow body.

3. The device according to claim 2 in which said display means includes:

a plate having a plurality of openings extending therethrough, each of said openings receiving one of said fiber optic means;

representation means having a representation of a tracheobronchial tree with the same segments as said tracheobronchial tree segments of said hollow body and disposed adjacent and above said plate;

said representation means having openings therein, each of said openings receiving one of said fiber optic means;

and each of said openings in said plate being aligned with said corresponding opening in said representation means in the same segment of the tracheobronchial tree of the representation as said tracheobronchial tree segment of said hollow body having said opening with which said fiber optic means is communicating.

4. The device according to claim 3 in which said support means includes:

first support means to support said hollow body and said display means;

second support means to support said first support means;

and said first support means having an opening to receive a portion of said hollow body having said entrance opening to enable said entrance opening of said hollow body to be exposed exteriorly of said first support means to receive a bronchoscope.

5. The device according to claim 4 in which said first support means includes means to support said preventing means.

6. The device according to claim 4 in which said first support means includes:

a first portion to support said hollow body;

a second portion to support said display means;

and said first portion and said second portion being disposed at an angle to each other.

7. The device according to claim 1 in which said display means includes:

a plate having a plurality of openings extending therethrough, each of said openings receiving one of said fiber optic means;

representation means having a representation of a tracheobronchial tree with the same plurality of segments as said tracheobronchial tree segments of said hollow body and disposed above said plate;

said representation means having openings therein, each of said openings receiving one of said fiber optic means;

and each of said openings in said plate being aligned with said corresponding opening in said representation means in the same segment of the tracheobronchial tree of the representation as said tracheobronchial tree segment of said hollow body having said opening with which said fiber optic means is communicating.

8. The device according to claim 7 in which said support means includes:

first support means to support said hollow body and said display means;

second support means to support said first support means;

and said first support means having an opening to receive a portion of said hollow body having said entrance opening to enable said entrance opening of said hollow body to be exposed exteriorly of said first support means to receive a bronchoscope.

9. The device according to claim 8 in which said first support means includes:

a first portion to support said hollow body;

a second portion to support said display means;

and said first portion and said second portion being disposed at an angle to each other.

10. The device according to claim 1 in which said display means has openings located in the representation of the tracheobronchial tree, each of said openings receiving one of said fiber optic means.

* * * * *